(12) United States Patent
Joss et al.

(10) Patent No.: US 8,230,392 B2
(45) Date of Patent: Jul. 24, 2012

(54) DETERMINING THE REUSE VALUE OF A SERVICE COMPONENT

(75) Inventors: Andrew Joss, Nuthall (GB); Peter H. Naylor, Doncaster (GB)

(73) Assignee: International Business Machines Corporation, Armonk, NY (US)

(*) Notice: Subject to any disclaimer, the term of this patent is extended or adjusted under 35 U.S.C. 154(b) by 1282 days.

(21) Appl. No.: 11/942,104

(22) Filed: Nov. 19, 2007

(65) Prior Publication Data

US 2008/0127079 A1 May 29, 2008

(30) Foreign Application Priority Data

Nov. 25, 2006 (GB) .................................. 0623525.3

(51) Int. Cl.
*G06F 9/44* (2006.01)
(52) U.S. Cl. ................. 717/120; 717/127; 717/131
(58) Field of Classification Search ........... 717/120–135
See application file for complete search history.

(56) References Cited

U.S. PATENT DOCUMENTS

| | | | | |
|---|---|---|---|---|
| 5,404,510 | A * | 4/1995 | Smith et al. ........................ | 1/1 |
| 6,978,463 | B2 * | 12/2005 | Yanosy ......................... | 719/318 |
| 7,100,155 | B1 * | 8/2006 | Wu ............................... | 717/158 |
| 7,356,805 | B2 * | 4/2008 | Ding et al. ..................... | 717/128 |
| 7,627,855 | B2 * | 12/2009 | Inoue et al. .................... | 717/120 |
| 2003/0159131 | A1 * | 8/2003 | Litoiu et al. .................. | 717/120 |
| 2003/0233631 | A1 * | 12/2003 | Curry et al. ................... | 717/100 |
| 2004/0172612 | A1 * | 9/2004 | Kasravi et al. ................ | 717/101 |
| 2005/0044197 | A1 * | 2/2005 | Lai ................................ | 709/223 |
| 2006/0031048 | A1 * | 2/2006 | Gilpin et al. ..................... | 703/6 |
| 2006/0230396 | A1 * | 10/2006 | Martinez et al. ............... | 717/173 |

OTHER PUBLICATIONS

Poulin, J.S.; Caruso, J.M.; , "Determining the value of a corporate reuse program," Software Metrics Symposium, 1993. Proceedings., First International , vol., no., pp. 16-27, May 21-22, 1993.*
Jian Yang and Mike. P. Papazoglou, Web Component: A Substrate for Web Service Reuse and Composition, Publisher: Springer Berlin / Heidelberg, vol. 2348, pp. 21-36.*
Yonghao Chen; Cheng, B.H.C.; , "Formalizing and automating component reuse," Tools with Artificial Intelligence, 1997. Proceedings., Ninth IEEE International Conference on , vol., no., pp. 94-101, Nov. 3-8, 1997.*
Kontio et al., Defining factors, goals and criteria for reusable component evaluation, Presented at the CASCON '96 conference, Toronto, Canada, Nov. 12-14, 1996, pp. 1-12.*
William Frakes; Software Reuse: Metrics and Models, ACM Computing Surveys, vol. 28, No. 2, Jun. 1996, pp. 415-435.*

* cited by examiner

*Primary Examiner* — Wei Zhen
*Assistant Examiner* — Satish Rampuria
(74) *Attorney, Agent, or Firm* — Hoffman Warnick LLC; Andrea Bauer

(57) ABSTRACT

An apparatus for determining a reuse value of a service component associated with a first service in a service orientated architecture, the apparatus including: a first assignor component for assigning a first variable to the service component, the first variable associated with a process of generating the service component; a second assignor component for assigning a second variable to the service component, the second variable being associated with a reuse factor derived from a reuse of the service component in the first service; and a calculation component for using the first and second variables to determine a third variable associated with the service component, wherein the third variable is associated with a reuse value of the service component for reuse in a second service.

19 Claims, 7 Drawing Sheets

Re-use data

FIG. 5a

| Complexity Rating | Initial Build | 1st Reuse | 2nd Reuse | 3rd Reuse | 4th Reuse | nth Reuse |
|---|---|---|---|---|---|---|
| Easy | 1 | 10% | 20% | 30% | 40% | .. |
| Medium | 2.5 | 10% | 20% | 30% | 40% | .. |
| Complex | 5 | 10% | 20% | 30% | 40% | .. |

Reuse Calculation is:
Effort = Initial Build – (Reuse Percentage * Initial Build)

Example: 1 – (20% * 1) = 0.8

FIG. 5b

Reuse value calculation

| Fine Grain Service | Complexity Rating | Initial Build | 1st Reuse | 2nd Reuse | 3rd Reuse | nth Reuse |
|---|---|---|---|---|---|---|
| Comm - 345 | Easy | 1 | 0.9 | 0.8 | 0.7 | .. |
| Comm – 350 | Medium | 2.5 | 2.25 | 2.0 | 1.75 | .. |
| Comm – 355 | Complex | 5 | 4.5 | 4.0 | 3.5 | .. |

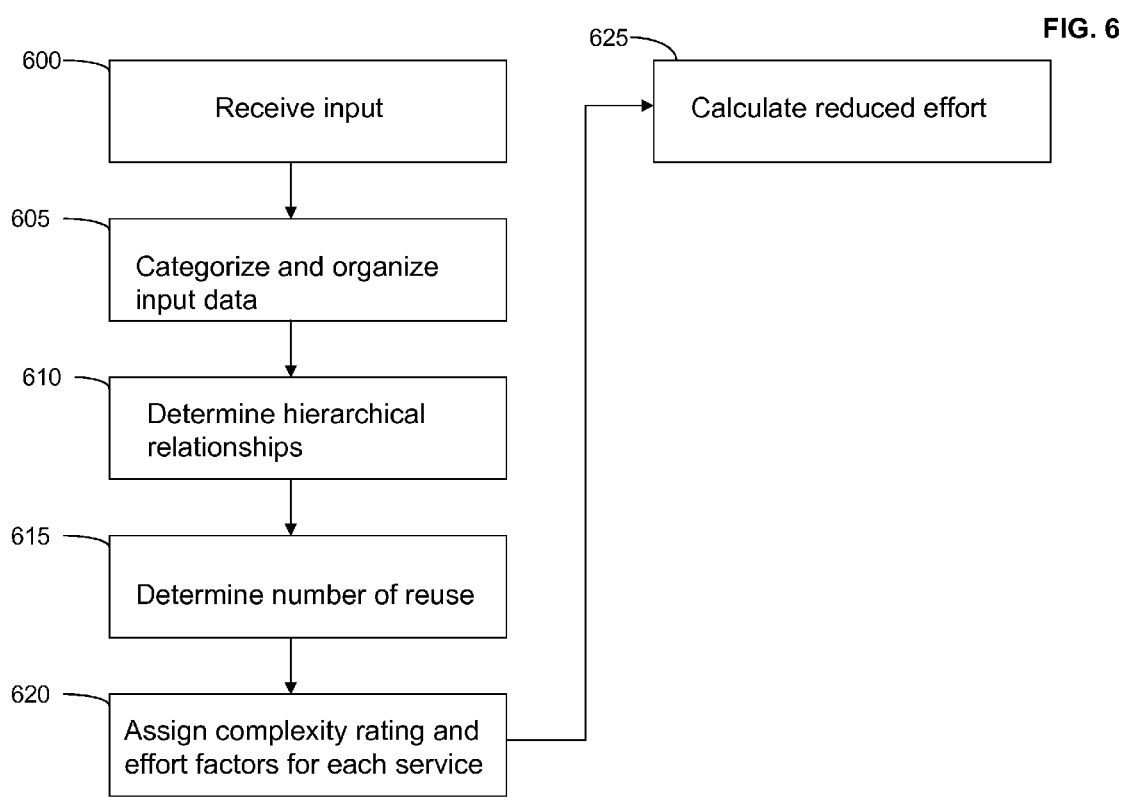

DETERMINING THE REUSE VALUE OF A SERVICE COMPONENT

CROSS-REFERENCE TO RELATED APPLICATION

This application claims priority from United Kingdom Patent Application Reference No. 0623525.3, filed Nov. 25th, 2006, the entire content of which is incorporated herein by reference for all purposes.

FIELD OF THE INVENTION

The invention relates to the field of service orientated architecture. In particular, the invention relates to a method and apparatus for determining reuse value of a service component in a service orientated architecture.

BACKGROUND OF THE INVENTION

Currently, the most common way of designing and constructing an application is to analyze the functional requirements of the application and to break down the development of the application into a number of manageable functional components. Each of these components is coded in such a way to interface with another component in order to generate the final application. A disadvantage of building applications in this way is that there is no form of reuse as one component is often built to interface with a specific component and not other components. This is inefficient because a developer has to re-write code each time a particular component is built in order for it to communicate with and interface to a specific component.

A more effective method of designing and building these components is to change the basic premise that a component can only work with another specific component. Hence, components are now coded with a set of rules that present an interface to any other component. An interface defines what information is passed to and from one component to another. An example of this is where a component will only allow a customer number to be sent to it and will only send back an account balance. Only by following these rules can one component send or receive information from another component. By hiding what the component actually does behind these rules and only allowing communication to it by following these rules, components can be reused.

The above concepts define a Service Orientated Architecture (SOA). By providing the right type of software infrastructure it is now possible to reuse any component as part of any number of applications. Therefore components can be thought of in terms of service components, i.e., a component providing a service to other components. Service components are now inherently reusable, i.e., one service component can be used as part of several services. Hence, a software developer only has to write the service component once and after that the service component can be reused as appropriate in any number of other applications.

For example, service 'A' comprises four service components, namely service component one, service component two, service component three, and service component four. If each service component represents one unit of work to develop, service 'A' will take four units of work to develop. However, service 'B' is made up of service component one, service component two, service component five and service component six. Therefore, as service component one and service component two can be reused from service 'A'; service 'B' will take just two units of work to develop instead of four.

However, there is a need in the art to develop an approach to understanding reuse value of a service component in a service orientated architecture.

SUMMARY OF THE INVENTION

Viewed from a first aspect, the present invention comprises an apparatus for determining a reuse value of a service component associated with a first service in a service orientated architecture, comprising: a first assignor component for assigning a first variable to the service component, the first variable associated with a process of generating the service component; a second assignor component for assigning a second variable to the service component, the second variable being associated with a reuse factor derived from a reuse of the service component in the first service; and a calculation component for using the first and second variables to determine a third variable associated with the service component, wherein the third variable is associated with a reuse value of the service component for reuse in a second service.

Advantageously, the reuse value apparatus provides for a service to be analyzed to determine a number of service components that 'make up' the service. These service components can provide business or technical functions. A hierarchical tree is built showing the relationships between one service component and another service component. It is then possible to determine how many times a service component is used in the initial build of a service and how many times a service component is reused in the same service. Once this is achieved, each of the service components is assigned a complexity factor which is associated with how difficult it is to build that particular service component, an effort factor which is associated with how much resource (hardware, software, manpower, etc.) is required in building the service, and a reuse percentage factor which is associated with the fact that for every time a service component is reused only a certain percentage of the service component can be reused without modification. An algorithm calculates the final reuse value by determining the reduction in effort required each time the service component is reused. Additional services can be plugged into the hierarchical tree and the additional service is again analyzed to determine whether there is any commonality between the additional service's service components and the first service's service components and if there is commonality the reuse value of reusing each of the common service components in the additional service is determined.

Viewed from a second aspect, the present invention provides a method for determining a reuse value of a service component associated with a first service in a service orientated architecture, comprising: assigning a first variable to the service component, the first variable associated with a process of generating the service component; assigning a second variable to the service component, the second variable being associated with a reuse factor derived from a reuse of the service component in the first service; and using the first and second variables to determine a third variable associated with the service component, wherein the third variable is associated with a reuse value of the service component for reuse in a second service.

Viewed from a third aspect, the present invention provides a computer program loadable into the internal memory of a digital computer, comprising software code portions for performing, when the computer program is run on a computer, to carry out the method of the invention as described above.

BRIEF DESCRIPTION OF THE DRAWINGS

Embodiments of the invention are described below in detail, by way of example only, with reference to the accompanying drawings.

FIGS. 5a and 5b are tables showing example data of the reuse percentage values, the complexity rating, and effort factors and how the reduction in effort gained when reuse the service components is calculated in accordance with an embodiment of the present invention.

FIG. 6 is a flow chart showing a process in accordance with an embodiment of the present invention.

DETAILED DESCRIPTION OF THE INVENTION

Figure 1:
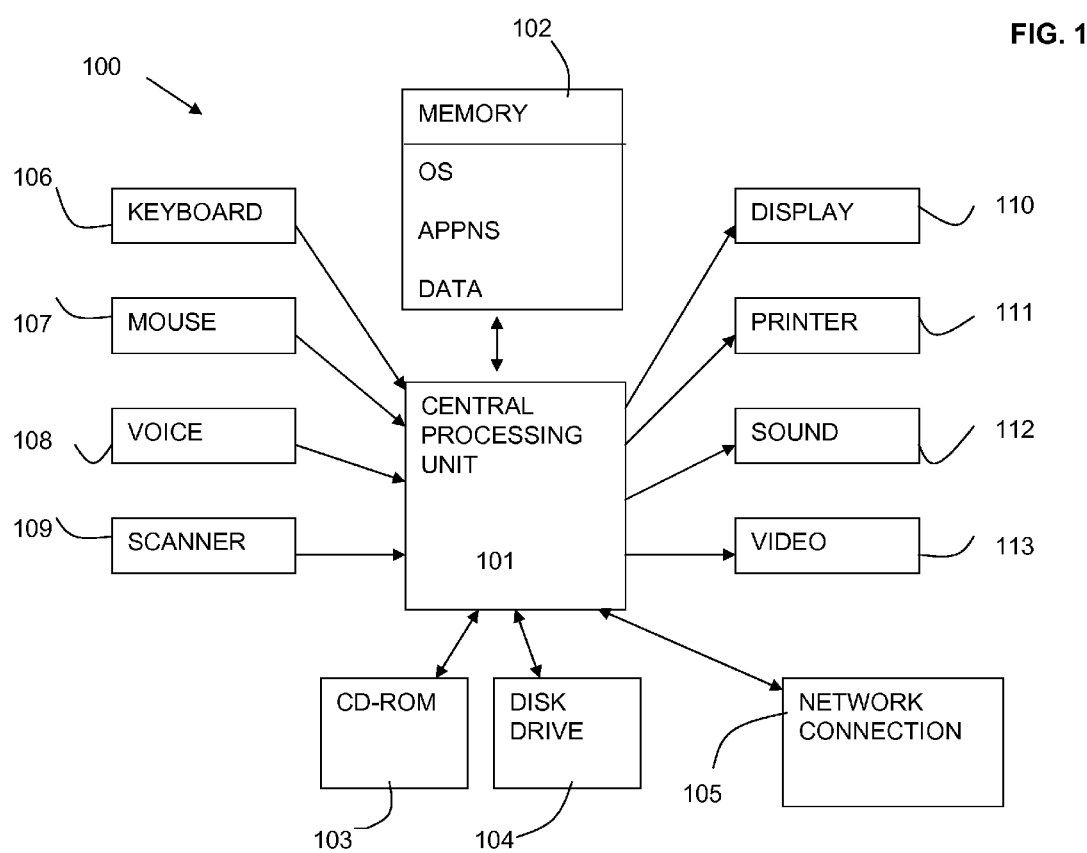
FIG. 1 is a block diagram showing a computer system in which the present invention may be implemented.

Referring to FIG. 1, a computer system 100 is shown in which an embodiment of the present invention may be implemented. The computer system 100 has a central processing unit 101 with primary storage in the form of memory 102 (RAM and ROM). The memory 102 stores program information and data acted on or created by application programs. The program information includes the operating system code for the computer system 100 and application code for applications running on the computer system 100. Secondary storage includes optical disk storage 103 and magnetic disk storage 104. Data and program information can also be stored and accessed from the secondary storage.

The computer system 100 includes a network connection 105 for interfacing the computer system 100 to a network such as a local area network (LAN) or the Internet. The computer system 100 may also have other external source communication means such as a fax modem or telephone connection.

The central processing unit 101 comprises inputs in the form of, as examples, a keyboard 106, a mouse 107, voice input 108, and a scanner 109 for inputting text, images, graphics, and/or the like. Outputs from the central processing unit 100 may include a display means 110, a printer 111, sound output 112, video output 113, etc.

In a distributed system, a computer system 100, as shown in FIG. 1, may be connected via the network connection 105 to a server (not shown) on which applications may be run remotely from the central processing unit 101, which is then referred to as a client system.

Applications may run on the computer system 100 from a storage unit 103, 104 or via a network connection 105, which may include spread sheet applications, database applications, and other storage and retrieval mechanisms.

Figure 2:
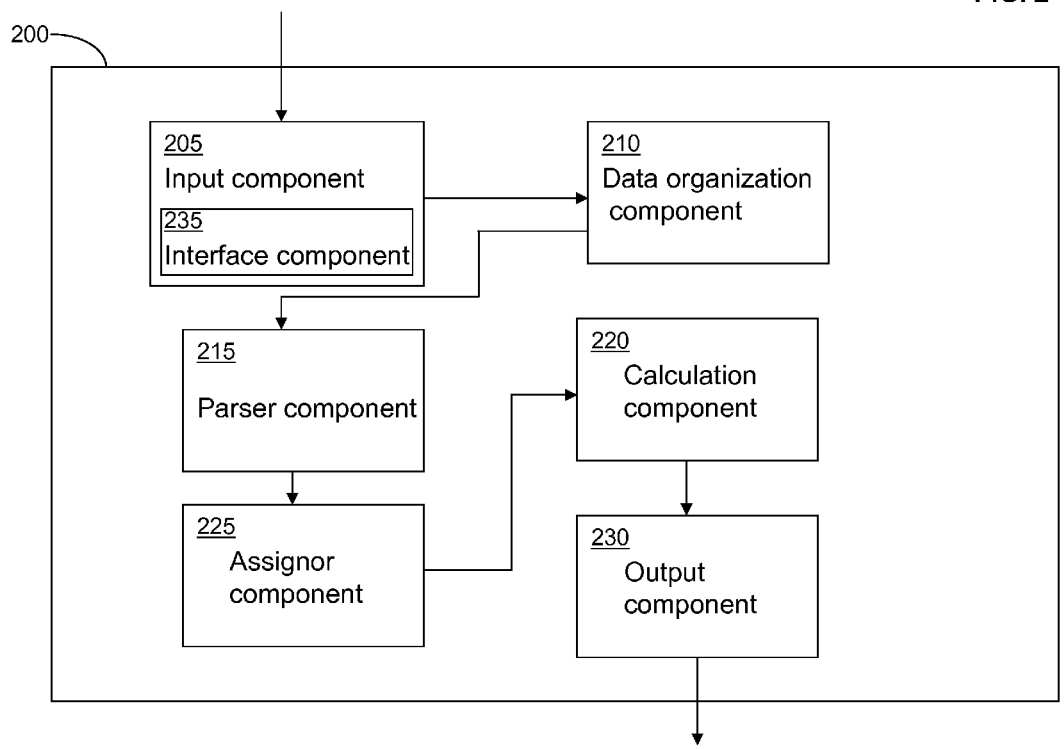
FIG. 2 is block diagram showing the components of the reuse value calculation component in accordance with an embodiment of the present invention.

Referring to FIG. 2, a reuse value apparatus 200 is provided in which a reuse value of a service component, in a service orientated architecture, is determined. The reuse value apparatus 200 is operable with existing service orientated architecture modeling tools as a plug in application or as a standalone application.

The reuse value apparatus 200 receives input data associated with a service which a user wishes to deploy, for example, a flight booking service. The reuse value apparatus 200 decomposes the service (the flight booking service) into a number of service components, which are required by the service in order to perform its function of reserving and booking flights with airline companies. For example, a flight booking service can comprise a web services component (for logging on to the flight booking web site), a payment services component (for paying for a flight), an airline booking services component (for interacting with a chosen airline), etc. A services component can be a component providing technical services or a component providing business services etc.

Figure 3:
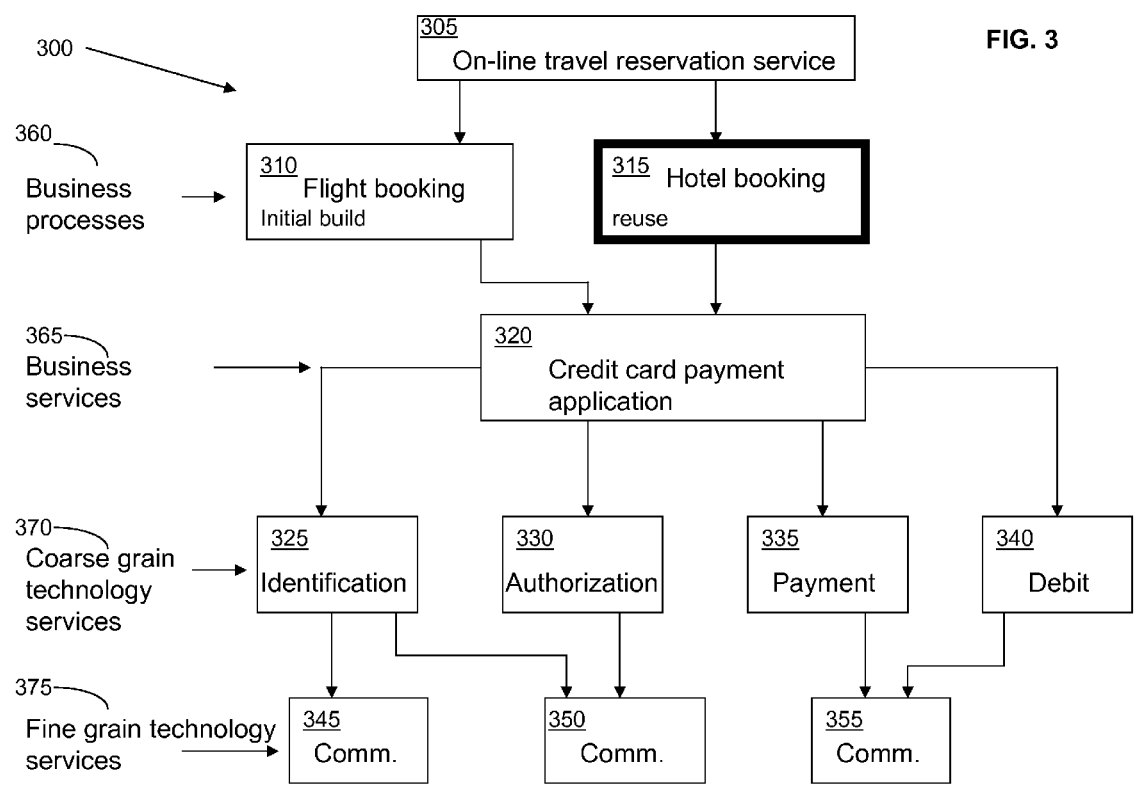
FIG. 3 is tree structure showing the relationships between service components, in a service orientated architecture, of a travel reservation system in accordance with an embodiment of the present invention.

Once the service is decomposed into its respective service components, the reuse value apparatus 200 determines at least one relationship between a decomposed service component and other decomposed service components. This is achieved by building a hierarchical tree 300 (FIG. 3) showing each of the decomposed service components and its relationship to other decomposed service components. At the root of the tree the service to be deployed is stored. Then, moving down each level of the tree 300 are the service components that are required by the service in order to perform its function. For example, as shown in FIG. 3, the hierarchical tree 300 is shown depicting the decomposed service components of an on-line travel reservation service 305.

Each level of the tree 300 is categorized into service components which provide business processes functions 360, business services functions 365, coarse grain technology service functions 370, and fine grain technology service functions 375. An arrow flowing from one service component to another service component indicates that a service component is required by the other service component.

Working from the root of the tree 300 to its lowest leaf nodes, the root stores the on-line travel reservation service 305. Moving down to the next level of the tree 300, the tree 300 stores the business process service components 360, which are required by the online travel reservation service, e.g., the flight booking service 310 and the hotel booking service 315.

Moving down to the next branch of the tree 300, the tree 300 stores the business service components 365, e.g., the credit card payment service component 320, which is required by the business process service components 360

Moving down another branch of the tree 300, the tree 300 stores the coarse grain technology components 370, e.g., an identification service component 325, an authorization service component 330, a payment service component 335, and a debit service component 340, which are all needed by the credit card payment service component 320.

Lastly, at the bottom of the tree 300, the tree 300 stores the fine grain technology service components 375 which are required by the coarse grain technology component 370. For example, a communication service component 345 is required by the identification service component 325, while the communication service component 350 is required by the identification service component 325 and the authorization service component 330. A communication service component 335 is required by the payment service component 335 and the debit service component 340.

Thus, the reuse value apparatus 200 builds up a picture of which service components are required by other service components. Thus, when building the flight booking service 310 for the first time, all of the service components shown in the tree will have to be developed and built. However, when building the hotel booking service 315, the tree 300 shows that all of the service components which are required by the flight booking service 310 are also required by the hotel booking service 315 and therefore can be re-used albeit with some modification.

Moving back to FIG. 2, the re-use value apparatus 200 analyses the tree 300 to identify each service component's relationship to other service components. For example, the credit card payment service component 320 uses the identification service component 325, the authorization service component 330, the payment service component 335, and the debit service component 340.

The reuse value apparatus 200 assigns a complexity factor and an effort factor, derived from historical data, to each of the service components in the tree 300. The complexity factor is associated with how difficult the component is to build and the effort factor is associated with how much effort, time, and resources are required in order to build the service component.

For example, a reuse value of one hundred percent indicates that one hundred percent of the service component can be reused. Whereas a reuse value of fifty percent indicates that quite a lot of work needs to be performed on the service component before the service component is ready to be reused with another service. Using effort factor and the complexity rating combined with a predefined percentage re-use value it is possible to calculate a reduction in effort value for each service component identified in the tree. How the calculation is performed is explained in more detail with reference to the reuse value apparatus 200 below.

The reuse value apparatus 200 comprises a number of components which interface and interact with each other in order to provide the benefits and advantages of an embodiment of the present invention. The reuse value apparatus 200 comprises the following components: an input component 205 for receiving details pertaining to a service, an interface component 235 for providing an interface for decomposing the service into its service components, a data organization component 210 for parsing the input data and structuring the decomposed service into a hierarchical relationship tree, a parser component 215 for parsing each branch of the tree, an assignor component 225 for assigning a complexity factor, a relative effort factor, and a percentage reuse value to each identified service relationship, a calculation component 220 for determining the reuse value of each service component based on the assigned parameters from the assignor component 225, and an output component 230 for displaying the calculated reuse value for each of the service components identified in the tree.

The input component 205 receives input data from a user or other external entity. The input data comprises data associated with functional characteristics of the service to be analyzed, e.g., the service components that make up the service.

For example, if the service to be analyzed is an online travel reservation service, the service components may comprise a credit card processing service component comprising a strict set of rules which defines how credit card information is passed to and from it, a bank authorization service component again with a strict set of rules, a bank identification service component, a debit service component, and a communication service component that is required to interface between online travel reservation service and a number of credit card companies.

The input component 205 may comprise an interface component 235 which provides prompts in order to extract the functional information from the user about the service. The prompts may be represented as follows:

Define all key business processes
Example: A key business process can be characterized as the service which is to be implemented—for example an online travel reservation service.

Define each step of a business process
Example: In an on-line travel reservation service the business process steps may comprise: logging on to the on-line travel reservation service, selecting from a list of available options a preferred flight and hotel, and paying for the selected flight and hotel.

Define all business services that will be used by each of the business processes defined above.
Example: An authentication service component would be required to enable a user to log onto the on-line travel reservation service, or a registration service component if it was the first time that a user had visited the system, a flight reservation service component for booking a flight with a particular airline, a hotel reservation service component for booking a hotel with a particular hotel chain, and a credit card payment service component for handling the payment of the flight and hotel.

Define all coarse grain technology services that will be used by each of the business services
Example: For a credit card payment service component—the coarse grain technology services may comprise: a second authentication service component, an identification service component, a debit service component and a credit service component.

Define all fine grain technology services that will be used by each of the course grain technology services.
Example: Fine grained technology services may comprise, in a credit card processing service component, the communication mechanisms in which the on-line travel reservation service would communicate with the credit card companies.

In another embodiment the input component 205 may receive the input data from a data feed. The data feed comprises data pertaining to the business and technological services of the application. The data feed can be sent from a crawler application which probes the service over a period of time to determine the business and technological services that the service is composed of.

The input component 205, on receipt of the input data, triggers the data organization component 210 to build a hierarchical tree structure showing the relationships between the service to be implemented and each of its service components. An example of a hierarchical tree structure is shown in FIG. 3.

The hierarchical tree structure 300 represents the relationships between each of the service components in an online travel reservation service.

The root of the tree comprises the service to be implemented, in this example, an on-line travel reservation service 305. At the next level in the tree are the business processes that support the on-line travel reservation service 305, e.g., the flight booking service and the hotel booking service.

Traversing down to the next level of the tree 300 are the business services that support the business processes, e.g., a credit card payment service component 320.

Moving down to the next level in the tree 300 are the coarse grain technology services which support the business services, e.g., an identification service component 325, an authorization service component 330, a payment service component 335, and a debit service component 340.

At the lowest level in the tree 300, each of the fine grain technology service components 375 which support the coarse grain technology services 370 are represented. These are shown in FIG. 3 as a variety of communication service components which are needed in order to: a) communicate with the credit card company to authorize the credit card transaction; b) authenticate the credit card transaction; c) request payment; and d) transfer the payment to the vendor.

Thus, the data organization component 210 is able to build a map detailing which service components are dependent on other service component and also which service components are used more than once by other service components. For example, communication service component 350 is used twice, once by the identification service component 325 and once by the authorization service component 330.

On completion of the data organization step, the assignor component 225, starting at the lowest level in the tree, i.e., at the fine grain technology service components 375, traverses each branch of the tree 300 to determine the following:

how many times each of the fine grained technology service components are used by coarse grained technology service component;

how many times each course grain technology service component is used by a business service component; and for each business service, how many times each business service component is used in a business process service component.

For example, working through the tree structure 300 of FIG. 3 starting at service component 345 (the fine grained technology service components) and traversing the tree towards the root from left to right:

A) Communication service component 345 (fine grained technology service) is used once in the initial build of the flight booking service component 310 (i.e., this is first time service component 345 was built) and then is reused once by the identification service component 325 within the hotel booking service 315. Total reuse is once.

B) Communication service component 350 (fine grained technology service) is used in the initial build of the flight booking system 310 and then is reused three times, once by identification service component 325 of the flight booking service 310, once by the identifications service component 325, and once by the authorization service component 330 of the hotel booking service 320. This makes a total reuse of three.

C) Communication service component 355 (fine grained technology service) is used in the initial build of the flight booking service 310 (dependent on the payment service component 335) and then is reused three times, once by the debit service component 340 of the flight booking service 310, once by the payment service component 355 of the hotel booking service 315, and once by the debit service component 340 of the hotel booking service 315. This makes a total reuse of three.

D) Identification service component 325 (coarse grained technology service component) is used once in the initial build of the credit card payment service component 320 of the flight booking service component 310 and then is reused once by the credit card payment application service component 320 in the hotel booking service 315. Total reuse is once.

E) Authorization component 330 (coarse grained technology service component) is used once in the initial build of the credit card payment service component 320 of the flight booking service 310 and then is reused once by the credit card payment application service component 320 in the hotel booking service 315. Total reuse is once.

F) Payment service component 335 (coarse grained technology service component) is used once in the initial build of the credit card payment service component 320 of the flight booking service 310 and then is reused once by the credit card payment application service component 320 in the hotel booking service 315. Total reuse is once.

G) Debit service component 340 (coarse grained technology service component) is used once in the initial build of the credit card payment service component 320 of the flight booking service 310 and then is reused once by the credit card payment service component 320 in the hotel booking service 315. Total reuse is once.

H) The credit card application service component 320 (business service 365) is used once in the initial build of the flight booking service 310 and then is reused once by the hotel booking service 315. Total reuse is once.

I) There is no reuse for the flight booking service 310 or the hotel booking service 315 within the business process layer 360 because the flight booking service 310 and the hotel booking service 315 are made up of the service components shown in the tree of FIG. 3 and have no additional technical components themselves.

As the parser component 215 traverses each branch of the tree 300, the parser component 215 writes data collected by the assignor component 225 to a table. The table provides a complete map of how many times each service is used and the service relationships across each of the layers of the hierarchy. On each traverse of the tree 300 the assignor component 225 also assigns a complexity rating of, for example, easy, medium, or high which represents how easy or difficult it is to build the service from the start to finish, for each of the services. Each complexity rating has a corresponding relative effort factor to reflect the amount of effort required to design and construct the services. For example:

A complexity rating of easy is assigned a relative effort factor of 1;

A complexity rating of medium is assigned a relative effort factor of 2.5; and

A complexity rating of difficult is assigned a relative effort factor of 5.

A person skilled in the art will appreciate that a number of different values can be used to represent the complexity rating and effort factor of a service component without departing from the scope of the invention.

The assignor component 225 assigns each service component which it traverses in the tree 300 with a complexity rating and a relative effort factor. This is shown in FIG. 4.

Figure 4:
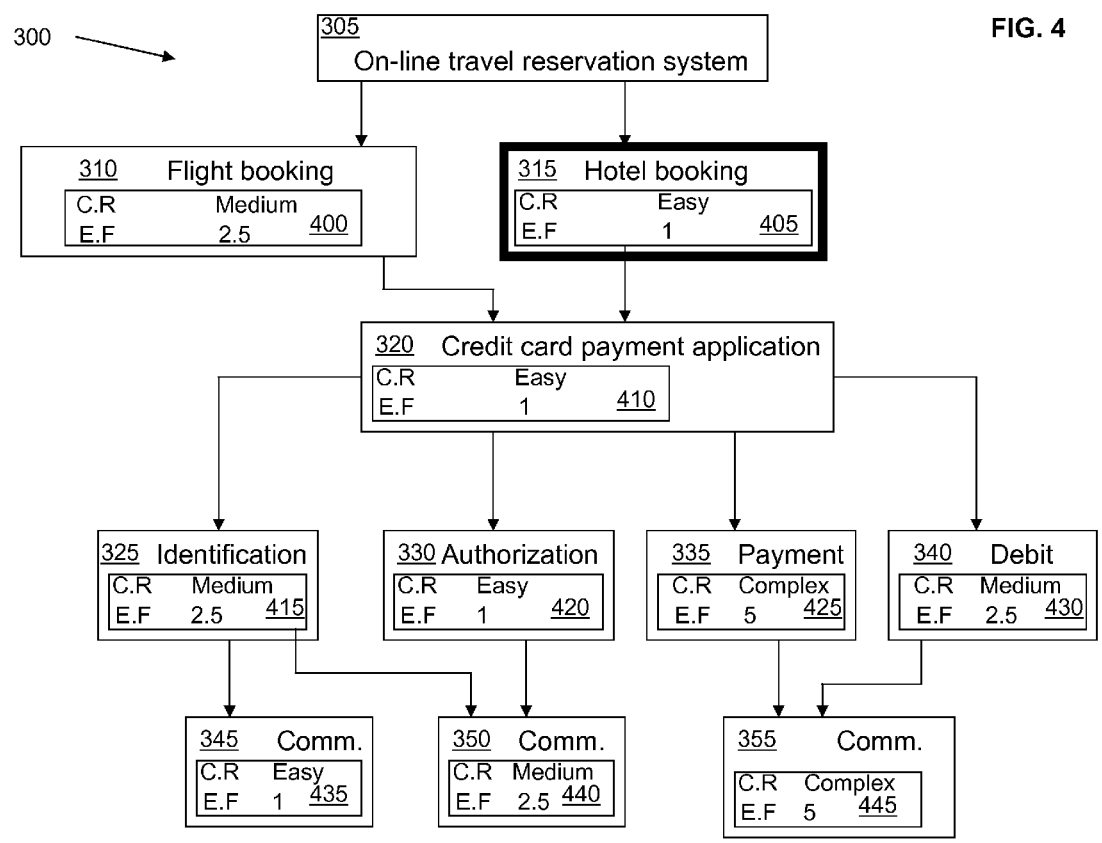
FIG. 4 shows each service component, of the tree structure of FIG. 3, having an assigned complexity rating and relative effort factor in accordance with an embodiment of the present invention.

Working through the example in FIG. 4, the parser component 215 begins traversing the tree structure 300 starting at service component 345 and moving to service component 325, to 320 and to 310. On completion of this traverse the parser component 215 starts again at service component 345 moving to 325 then to 320 and finally to 315. This traversing step is completed for each service component in the tree structure 300.

In FIG. 4, the service component 345 is assigned a complexity rating of easy and an effort factor 435 of one. Service component 350 is assigned a complexity rating of medium and an effort factor 440 of two and a half. Service component 355 is assigned a complexity rating of complex and an effort factor 445 of five. Service component 325 is assigned a complexity rating of medium and an effort factor 415 of two and a half. Service component 330 is assigned a complexity rating of easy and an effort factor 420 of one. Service component 335 is assigned a complexity rating of complex and an effort factor 425 of five. Service component 340 is assigned a complexity rating of medium and an effort factor 430 of two and a half. Service component 320 is assigned a complexity rating of easy and an effort factor 410 of one. Service component 310 is assigned a complexity rating of medium and an effort factor 400 of two point five. Service component 315 is assigned a complexity rating of easy and an effort factor 405 of 1.

The above data is also shown in table 1 below:

TABLE 1

| Reference numeral in FIG. 4 | Service component | Service Type | Number of reuse | Complexity factor | Assigned effort factor |
|---|---|---|---|---|---|
| 305 | On-line reservation | Business process | None | none | None |
| 310 | Flight booking | Business service | None | medium | None |
| 315 | Hotel booking | Business service | None | easy | none |
| 320 | Credit card payment | Coarse grain | 1 | easy | 1 |
| 325 | Identification | Coarse grain | 1 | medium | 2.5 |
| 330 | Authorization | Coarse grain | 1 | easy | 1 |
| 335 | Payment | Coarse grain | 1 | complex | 5 |
| 340 | Debit | Coarse grain | 1 | medium | 2.5 |
| 345 | Comm. | Fine grain | 1 | easy | 1 |
| 350 | Comm. | Fine grain | 3 | medium | 2.5 |
| 355 | Comm. | Fine grain | 3 | complex | 5 |

On completion of the assigning of the complexity rating and the effort factor to each of the service components in the hierarchical tree 300, the calculation component 220 calculates how much effort is saved each time any given service component is reused. This is to account for the fact that some service components may not be one hundred percent re-usable without some amount of modification. An example of this would be where the credit card processing application works in the English language but would need some modification to work in the French or German language.

For each service component defined in the hierarchical tree 300 of FIG. 4, the calculation component 220 determines, based on historical data, a reuse percentage factor for each time a service component is reused. An example of reuse percentage values are shown in FIG. 5, where for each complexity rating a reuse percentage of 10% (505), 20% (510), 30% (515) and 40% (520) to n % (525) is assigned for each time a service component is reused. Thus, the first time a service component is reused, 10% of the service component can be reused, with the other 90% needing to be modified for it to work with another service component. The second time a service component is reused, 20% of the service component can be reused, with the other 80% needing to be modified for it to work with another service component. The third time a service component is used, 30% of the service component can be reused, the fourth time a service component is reused, 40% of the service component can be reused, and so on.

Using this data, the calculation component 220 calculates a reduced effort factor or in other words how much effort is saved by re-using a service component through subsequent reuses.

The reduced effort factor is calculated using the following equation and is also shown in FIG. 5b:

Reduced effort factor=initial build−(Reuse percentage*initial build)

For example, referring to FIGS. 5a and 5b, two tables are shown. The table of FIG. 5a shows in column 530 the three different types of complexity ratings, i.e., easy 535, medium 540 and complex 545, column 500 details the initial build values for each of the complexity ratings in column 535, and columns 505 to 525 show the reuse percentage values for each number of reuse.

Example 1 illustrates how the reduced effort factor is calculated using the data in the table illustrated in FIG. 5a. The output of the calculation is then written to table shown in FIG. 5b. Then, a calculation is performed for every 'n' number or reuses. For example, taking the example of the communication service component 345, it can be seen that the service component has a complexity rating of easy, which is then assigned a relative effort factor of one.

In order to calculate the reduced effort factor for the first, second, third, and nth reuse the calculation is as follows:
First Reuse Effort reduction=1−(10%*1)=0.9. The output is written to the cell at row 585, column 560.

Second Reuse

Effort reduction=1−(20%*1)=0.8. The output is written to the cell at row 585, column 565.

Third Reuse

Effort reduction=1−(30%*1)=0.7. The output is written to the cell at row 585, column 570.

'nth' Reuse

Effort reduction=1−(n*1)=0·n. The output is written to the cell at row 585, column 575.

The same process is completed for the communication service component 350 (row 590 and columns 560 to 575), and the communications service component 355 (row 595 and columns 560 to 575).

Table 2 below shows the values and calculations used to determine the effort requirements both with and without using a service orientated architecture. The service orientated architecture calculation is the sum of the effort factors for all the service components, but with per-service percentage reduction based upon the number of times a service has been reused. This can be seen in FIG. 5b. The without SOA calculation is the sum of the effort factors for all the service components. There is no percentage reduction here as none of the components can be reused.

TABLE 2

| Complexity Rating | Is Composed of Fine Grain | Without SOA | With SOA | Without SOA Calc | With SOA Calc | Is Reused? |
|---|---|---|---|---|---|---|
| Identification - 325 | Comm - 345, Comm - 350 | 3.5 | 3.5 | 1 + 2.5 | 1 + 2.5 | No Reuse |

TABLE 2-continued

| Complexity Rating | Is Composed of Fine Grain | Without SOA | With SOA | Without SOA Calc | With SOA Calc | Is Reused? |
|---|---|---|---|---|---|---|
| Authorization - 330 | Comm - 350 | 2.5 | 2.25 | 2.5 | 2.25 | Comm - 350 1st Reuse |
| Payment - 335 | Comm - 355 | 5 | 5 | 5 | 5 | No Reuse |
| Debit - 340 | Comm - 355 | 5 | 4.5 | 5 | 4.5 | Comm - 355 1st Reuse |

Moving onto to FIG. 6, a process in accordance with an embodiment of the present invention is shown. At 600, the input component 205 receives input detailing the service components that 'make up' a service. The interface component 235 provides several prompts in the form of questions in order to decompose the service into a number of service components. At 605, data representing the decomposed service components is transmitted to the data organization component 210 and the data organization component 210 categorizes and organizes the data into various categories, for example, a business process 360, a business service 365, a coarse grain technology service 370, and a fine grain technology service 375.

At 610, the data organization component 210 builds a hierarchical tree structure 300 detailing each of the service components and determines (615) their respective relationships with other service components. For example, a service component is categorized as a coarse grain technology service component 370 and has a parent service component which resides in the business service layer 365 and one or more dependent fine grain technology service component 375, etc.

At 620, the parser component 215 parses the hierarchical tree 300 and determines how many times each service component is reused. This data is written to a table. The parser component 215 parses the hierarchical tree 300 a second time and working with the assignor component 225 assigns each service component a complexity rating and an effort factor at 625. Again this data is written to a table. The calculation component 220 working with the data written to the tables and using a predefined reuse percentage value calculates for each service component a reduced effort factor which depicts how much effort is saved at development time, build time and resource time etc when reusing a service component 'n' number of times. Therefore the reduced effort factor of building a car rental service can be calculated in accordance with the algorithm of FIG. 5b.

Figure 7:
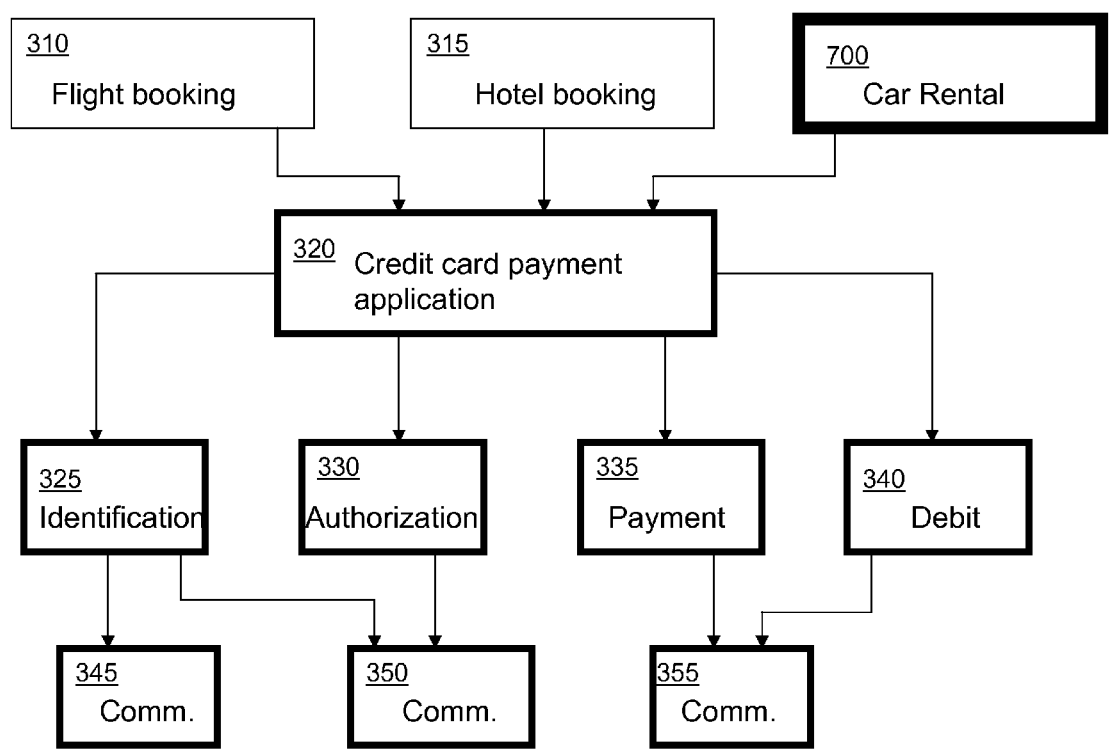
FIG. 7 shows the tree structure of FIG. 3 with the addition of car rental service in accordance with an embodiment of the present invention.

FIG. 7 illustrates what happens when a car rental application 700 is added to the on-line reservation system of FIG. 3. In this example, it can be seen that the car rental application 700 requires the same service components in order to perform its function. For example, the credit card payment service component 320, the identification service component 325, the authorization service component 330, the payment service component 335, the debit card service component 340, the communication service component 345, the communication service component 350, and the communication service component 355. Each of the service components would have the same complexity rating and effort factor of FIG. 4, but because of the addition of the car rental service component 800, all other service components will have been reused n+1 times with respect to the reuse values of FIG. 4. Therefore the reduced effort factor of building a car rental service can be calculated in accordance with the algorithm of FIG. 5b.

The foregoing description of embodiments of this invention has been presented for purposes of illustration and description. It is not intended to be exhaustive or to limit the invention to the precise form disclosed, and obviously, many modifications and variations are possible.

The invention claimed is:

1. An apparatus for determining a reuse value of a service component associated with a first service in a service orientated architecture, comprising:
   a computer device, including:
   a first assignor component for assigning a first variable to the service component, the first variable associated with a process of generating the service component, the first variable comprising an assigned complexity rating, derived from historical data, and a relative effort factor, derived from the assigned complexity rating;
   a second assignor component for assigning a second variable to the service component, the second variable being associated with a reuse factor derived from a reuse of the service component in the first service; and
   a calculation component for using the first and second variables to determine a third variable associated with the service component, wherein the third variable is associated with a reuse value of the service component for reuse in a second service.

2. The apparatus of claim 1, wherein the calculation component further determines the reuse value of the service component by subtracting the assigned first variable from a result of a multiplication of the first variable with second variable.

3. The apparatus of claim 1, wherein at least one of the first variable and the second variable is associated with a functional characteristic of the first service.

4. The apparatus of claim 1, further comprising:
   a receiving component for analyzing input data associated with functional characteristics of the first service.

5. The apparatus of claim 4, wherein the receiving component further decomposes the first service into a plurality of service components in dependence of the analyzed functional characteristics of the first service.

6. The apparatus of claim 5, further comprising:
   a data organization component for determining at least one relationship of each of the service components based on the analyzed functional characteristics of the first service.

7. The apparatus of claim 6, further comprising:
   a second data organization component for building a hierarchical tree structure associated with each of the determined relationships of each of the service components of the decomposed first service.

8. The apparatus of claim 7, further comprising:
   a parser component for analyzing the hierarchical tree structure to determine a number of times a service component is used within the first service.

9. The apparatus of claim 8, wherein the parser components differentiates between a first generation of the service component and a subsequent number of reuses of the service component in the first service or second service.

10. A method for determining a reuse value of a service component associated with a first service in a service orientated architecture, comprising:
   assigning a first variable to the service component, the first variable associated with a process of generating the service component, the first variable comprising an assigned complexity rating, derived from historical data, and a relative effort factor, derived from the assigned complexity rating;
   assigning a second variable to the service component, the second variable being associated with a reuse factor derived from a reuse of the service component in the first service; and
   using a computer device and the first and second variables to determine a third variable associated with the service component, wherein the third variable is associated with a reuse value of the service component for reuse in a second service.

11. The method of claim 10, wherein the calculation further comprises:
   calculating the reuse value of the service component by subtracting the assigned first variable from a result of a multiplication of the first variable with second variable.

12. The method of claim 10, wherein at least one the first variable and the second variable is associated with a functional characteristic of the first service.

13. The method of claim 10, further comprising:
   analyzing input data associated with the functional characteristics of the first service.

14. The method of claim 13, wherein the analyzing further comprises:
   decomposing the first service into a plurality of service components in dependence of the analyzed functional characteristics of the first service.

15. The method of 14, further comprising:
   determining at least one relationship of each of the service components based on the analyzed functional characteristics of the first service.

16. The method of claim 15, further comprising:
   building a hierarchical tree structure associated with each of the determined relationships of each of the service components of the decomposed first service.

17. The method of claim 16, further comprising:
   analyzing the hierarchical tree structure to determine a number of times a service component is used within the first service.

18. The method of claim 17, further comprising:
   differentiating between a first generation of the service component and a subsequent number of reuses of the service component in the first service or second service.

19. A program product stored on a non-transitory computer readable medium, which when executed, determines a reuse value of a service component associated with a first service in a service orientated architecture, the computer readable medium comprising program code for:
   assigning a first variable to the service component, the first variable associated with a process of generating the service component, the first variable comprising an assigned complexity rating, derived from historical data, and a relative effort factor, derived from the assigned complexity rating;
   assigning a second variable to the service component, the second variable being associated with a reuse factor derived from a reuse of the service component in the first service; and
   using the first and second variables to determine a third variable associated with the service component, wherein the third variable is associated with a reuse value of the service component for reuse in a second service.

* * * * *